Patented Dec. 14, 1937

2,101,948

UNITED STATES PATENT OFFICE 2,101,948

SYNTHETIC RESIN

Felix Lauter, Evanston, Ill., assignor to Sealkote Corporation, Chicago, Ill., a corporation of Delaware No Drawing. Application December 7, 1935, Serial No. 53,430

4 Claims. (Cl. 260—8)

My invention relates to a synthetic resin of the glycerine-phthalic acid type; and the primary object of the invention is to provide a synthetic resin which will remain in solution with cellulose acetate for the production of a stable and transparent film.

Resinous products formed by reacting polybasic aromatic acids and polyhydric alcohols are known. Resins of this type containing polybasic aliphatic acids such as tartaric, maleic and succinic are also known.

Arsem in his United States Patent No. 1,098,776 describes a reaction product of 1 mol. of phthalic anhydride, 1 mol. of glycerine and 1 mol. of succinic acid. The patent also describes a reaction product of 1 mol. of phthalic anhydride, 1 mol. of glycerine and 1 mol. of lactic acid, claiming for the last product a flow point of 64° C. and stickiness, but that if the proportion of lactic acid were decreased the proportion of phthalic anhydride increased, the flow point would be raised, and by heating the material hardened.

It is a fact, however, that all condensation products of the prior art if effort be made to combine or mix them with cellulose acetate, have disadvantages such as the throwing out of the cellulose acetate or the production of a blush on the film obscuring its transparency.

I have now found that by using a monobasic aliphatic acid, such as lactic acid, as a catalyzer, in conjunction with phthalic anhydride and glycerine in proportions of $1/90$ of a mol. of lactic acid to 1 mol. of glycerine, under conditions which bring about the elimination of oxygen during the reaction, a material is obtained which is practically water white, and when dissolved in acetone or ethyl acetate, or both, is miscible in all proportions with cellulose acetate.

The following is a specific example of the method of producing the resinous product of the present invention: 296 parts, by weight, of phthalic anhydride and 184 parts of glycerine are heated in a closed vessel which is equipped with a reflux condenser that in turn is sealed by a water seal or other means so that during the time of reaction no oxygen can reach the materials under treatment except the amount of oxygen that is in the air space of the vessel and condenser. When the material is in a fluid state, which is approximately at 120° C., agitation is started and 2 parts of lactic acid are added to act exclusively as a catalyzing agent. The mass is heated for 2 hours at a temperature not higher than 160° C. and then is concentrated and distilled in an open vessel until a temperature not higher than 245° C. is reached.

The lactic acid is used merely as a catalyzer and in such small quantities, say from $1/50$ of a mol. to $1/100$ of a mol. that its presence in the final product is inappreciable.

The resin so produced has a melting point of about 73° C. and acid numbers between 65 and 73 and is consequently soft and plastic.

In place of using phthalic anhydride one could use phthalic acid.

For glycerine it would be possible to use glycol, sugars or other polyalcohols, although where a colorless solution is desired, glycerine is probably the only practical substance of this class.

I claim:

1. Method of producing a resinous reaction product which will remain in solution with cellulose acetate for the production of a stable and transparent film and is practically water white and when dissolved in acetone or ethyl acetate or both is miscible in all proportions with cellulose acetate that comprises heating an admixture of about 296 parts by weight of phthalic anhydride and about 184 parts of glycerine in an air tight container equipped with a sealed reflux condenser, agitating the mixture when it reaches a fluid state and then adding about 2 parts of lactic acid as a catalyzing agent, heating the mass for about 2 hours at a temperature not higher than 160° C. and concentrating and distilling in an open vessel at a temperature not to exceed 245° C.

2. Method of producing a resinous reaction product which will remain in solution with cellulose acetate for the production of a stable and transparent film and is practically water white and when dissolved in acetone or ethyl acetate or both is miscible in all proportions with cellulose acetate that comprises heating an admixture of about 296 parts by weight of phthalic anhydride and about 184 parts of glycerine in an air tight container equipped with a sealed reflux condenser, agitating the mixture when it reaches a fluid state and then adding lactic acid as a catalyzer in the proportion of from $1/100$ to $1/50$ mol. to 1 mol. of glycerine, continuing the heating of the mass, concentrating and distilling in an open vessel at a temperature not to exceed 245° C.

3. The reaction product of about 296 parts by weight of phthalic anhydride and about 184 parts of glycerine heated in an air tight container equipped with a sealed reflux condenser to which is added when in fluid state lactic acid as a catalyzer in the proportion of from $1/100$ to $1/50$ mol. to 1 mol. of glycerine which mass has then been continuously heated, concentrated and distilled in an open vessel at not over 245° C. which product will remain in solution with cellulose acetate for the production of a stable and transparent film and is practically water white and when dissolved in acetone or ethyl acetate or both is miscible in all proportions with cellulose acetate.

4. The reaction product of an admixture of about 296 parts by weight of phthalic anhydride and about 184 parts of glycerine heated in an air tight container equipped with a sealed reflux condenser to which is added when in fluid state about 2 parts of lactic acid as a catalyzer which mass has been continuously heated for about 2 hours at not higher than 160° C. and then concentrated and distilled in an open vessel at not over 245° C. which product will remain in solution with cellulose acetate for the production of a stable and transparent film and is practically water white and when dissolved in acetone or ethyl acetate or both is miscible in all proportions with cellulose acetate.

FELIX LAUTER.